March 12, 1968 W. A. NICHOLS ET AL 3,372,885

TAPE WINDER

Original Filed June 28, 1965

2 Sheets-Sheet 1

RALPH E. SIMPSON
WILLIAM A. NICHOLS
INVENTORS

BY John H. Crowe
AGENT

TAPE WINDER

Original Filed June 28, 1965

2 Sheets-Sheet 2

RALPH E. SIMPSON
WILLIAM A. NICHOLS
INVENTORS

BY John H. Crowe
AGENT 3,372,885

TAPE WINDER

William A. Nichols, 5617 Hawthorne Ave., and Ralph E. Simpson, 9815 Monte Vista Ave., both of Montclair, Calif. 91763

Continuation of application Ser. No. 467,229, June 28, 1965. This application Aug. 21, 1967, Ser. No. 662,187
10 Claims. (Cl. 242—55.21)

ABSTRACT OF THE DISCLOSURE

A tape winding apparatus having turntable means for receiving a longitudinally moving tape in edge standing orientation on the floor thereof, and guide means guiding the tape to the turntable means, said guide means guiding the tape from a horizontal position to a vertical position and imparting a turn to the tape to substantially change the direction of movement of the tape for delivery to the turntable means. The longitudinally moving tape transmits a rotative force to an upstanding wall on the turntable as it is delivered thereto whereby the tape is wound into spiralling coils which build inwardly to form a roll.

This application is a continuation of application Ser. No. 467,229, filed June 28, 1965, now abandoned.

This invention relates to means for automatically winding perforated tape in the process of production in the order in which it is produced. More particularly, the invention relates to such means adapted primarily for the automatic winding of unjustified paper tape copy intended for subsequent feeding to newspaper composing room computers for justification and feeding to linecasting machines equipped to operate automatically from such tape.

As those skilled in the art of newspaper composition are aware, linecasting machines (originally designed and built solely for manual operation) have in recent years been increasingly converted to automatic operation capability by the installation of a tape-controlled device known commerically as the Teletypsetter Operating Unit (hereinafter referred to as the Operating Unit, or simply Unit), a product of Fairchild Graphic Equipment, Division of Fairchild Camera and Instrument Corporation, Plainview, N.Y., which attaches directly to the key board of such a machine. Once a linecasting machine is so equipped, it can be converted from manual to automatic operation, or vice versa, by simple turning a tape feed control lever on the Operating Unit. The tape fed to the Operating Unit is of a specially prepared type having coded perforations, the function of the Unit being to read these combinations and translate them into mechanical actions which automatically operate the linecasting machine.

The perforated tape which controls the Operating Unit is prepared from blank paper tape of suitable type by means of a Teletypesetter Perforator, an instrument manufactured and sold by the company that produces the Operating Unit. The Teletypesetter Perforator (hereinafter referred to simply as a Perforator) is equipped with a fast keyboard and a mechanism cooperating therewith to punch code symbols comprising from one to six holes each, along with center tape feed holes, in the tape. No detailed discussion of the anatomy or mode of operation of the Perforator is here felt necessary, but a cursory knowledge of the tape handling particulars of that instrument, as well as of tape winding procedures of present day use, will, it is believed, be helpful to an understanding of the nature of, services performed by, and advantages over presently known tape winding means possessed by the tape winder of this invention. For these reasons, a brief discussion of the relevant aspects of the so-called Teletypesetter method of type production in which coded tape copy is prepared on a Perforator and thereafter fed to an Operating Unit on a linecasting machine for automatic control of the latter, follows.

Several Perforator models are suitable for use in the Teletypsetter (hereinafter abbreviated as TTS) method of type production, examples being the Standard Perforator, the Standard Light Touch "1000" Perforator, and the Multiface Light Touch "1035," to use the manufacturer's terminology. Unless it is modified in some way, however, the bare term "Perforator" will be used hereinafter in an alternatively inclusive sense to denote any model of that instrument. The Perforator is equipped with a tape reel container for housing a reel of blank paper tape; a punch block for perforating the tape; cooperating mans for moving and guiding the tape from its reel in the tape reel container past the punch block and out of the Perforator; a back space lever for permitting tape backspacing for error correction or other reason; and additional structural hardware, of no presently pertinent significance, for controlling or effecting the movement of the tape. From the punch block, the perforated tape is routed to an accessory tape winder, operated by a key wound spring motor. The tape winder has a plunger knob for manual starting and stopping purposes, and a stop lever which automatically stops the winder when the tape becomes taut.

While the TTS method of type production (hereinafter referred to as the TTS typesetting method) is a substantial improvement over the old manual typesetting operation, it still requires at least one trained operator for perforator keyboard work who must continuously make type justification, hyphenation, etc., decisions of the sort necessary for the production of usable tape copy as he works. These decision making burdens, of course, slow the operator down and result in a reduced rate of copy flow from his machine. In more recent years, the versatile computer has been drafted for the Perforator operator's decision making chores, thus freeing him for the production of straight unjustified copy, which he can turn out at a much faster pace, and with far less strain, than he can justified copy. Specially designed computers are available for such tape processing work and they function by reading unjustified tape copy and transmitting commands to a high speed tape punch mechanism which then prepares new tape in properly justified form for feeding to the Operating Unit of a linecasting machine.

The aforesaid accessory tape winder functions by winding tape on a reel from the inside out so that the final roll of tape is wound backwards, relative to the order in which it is fed to the winder. This is adequate where the roll of tape is to go directly to an Operating Unit on a linecasting machine, but inadequate where it is to be fed to a computer for justification processing (normally such processing also includes hyphenation of the copy, but, for simplicity's sake, it is customarily, as herein, referred to solely in justification terms) since there the system demands that the tape be fed in the chronological order of its production. This means that, for computer application the tape must either be left unrolled as it comes from the Perforator, or rolled in such a way that it can be unrolled in the order in which it is produced. We have now invented a winder which possesses the unique ability to so wind tape as to satisfy this condition and thereby provide rolls suitable for computer feed purposes.

The winder of this invention is, as will be seen, of simple and inexpensive construction with its manner of operation matching its construction in simplicity. The operation of the winder is such as to require no initial threading of the tape into its winding mechanism, a troublesome necessity of the aforesaid accessory winder, thereby removing any temptation to let the tape pile up on the floor, or elsewhere, rather than go to the trouble of threading it for winding purposes. Additionally, the winder has the advantage of receiving its winding energy from the moving tape itself, thereby obviating any need for safety stop means as insurance against continued winding of the device should the tape feed movement unexpectedly cease. Such a safety stop means is required for the aforesaid accessory winder, this feature being that previously referred to as "a stop lever which automatically stops the winder when the tape becomes taut."

Still another advantage of our new winder over that referred to herein as the accessory (by which is meant accessory to the Perforator) winder is a lack of necessity for painstaking alignment of the winding mechanism of the winder with advancing feed copy from a Perforator. Such alignment is necessary in the case of the accessory winder since it has a reel comprising front and back plates separated by four slotted mounting posts, the posts being so sized and spaced as to hold the plates apart the proper distance to admit the tape therebetween and to serve as a reel frame around which the tape winds, and it will be apparent that the reel must be in line with the tape to avoid possible damage to the latter, a danger of malfunctioning resulting from misalignment, or the like. As will subsequently appear, our new winder avoids the necessity of alignment supervision of the type required by the accessory winder as a result of a unique design and mode of operation which set it sharply apart, both structurally and functionally, from the conventional reel-winders exemplified by said accessory winder.

It is thus a principal object of this invention to provide a tape winder capable of automatically winding a longitudinally moving tape in such fashion as to yield a roll from which said tape unrolls in the same order as that in which it is received by the winder.

It is another object of the invention to provide such a winder which requires no initial threading of the feed tape into its winding mechanism.

It is still another object of the invention to provide such a winder so functionally interrelated with the movement of the incoming tape as to wind in substantial unison therewith and thus require no accessory safety or emergency means for stopping the winder should the feed tape movement unexpectedly cease.

It is yet another object of the invention to provide such a winder which inherently insures proper alignment of incoming tape to its winding mechanism.

Other objects, features and advantages of the invention will appear in the light of the following description, considered in conjunction with the accompanying drawings showing a preferred embodiment of our winder in various views, of which:

Figures 1, 2, 3, 4, 5:
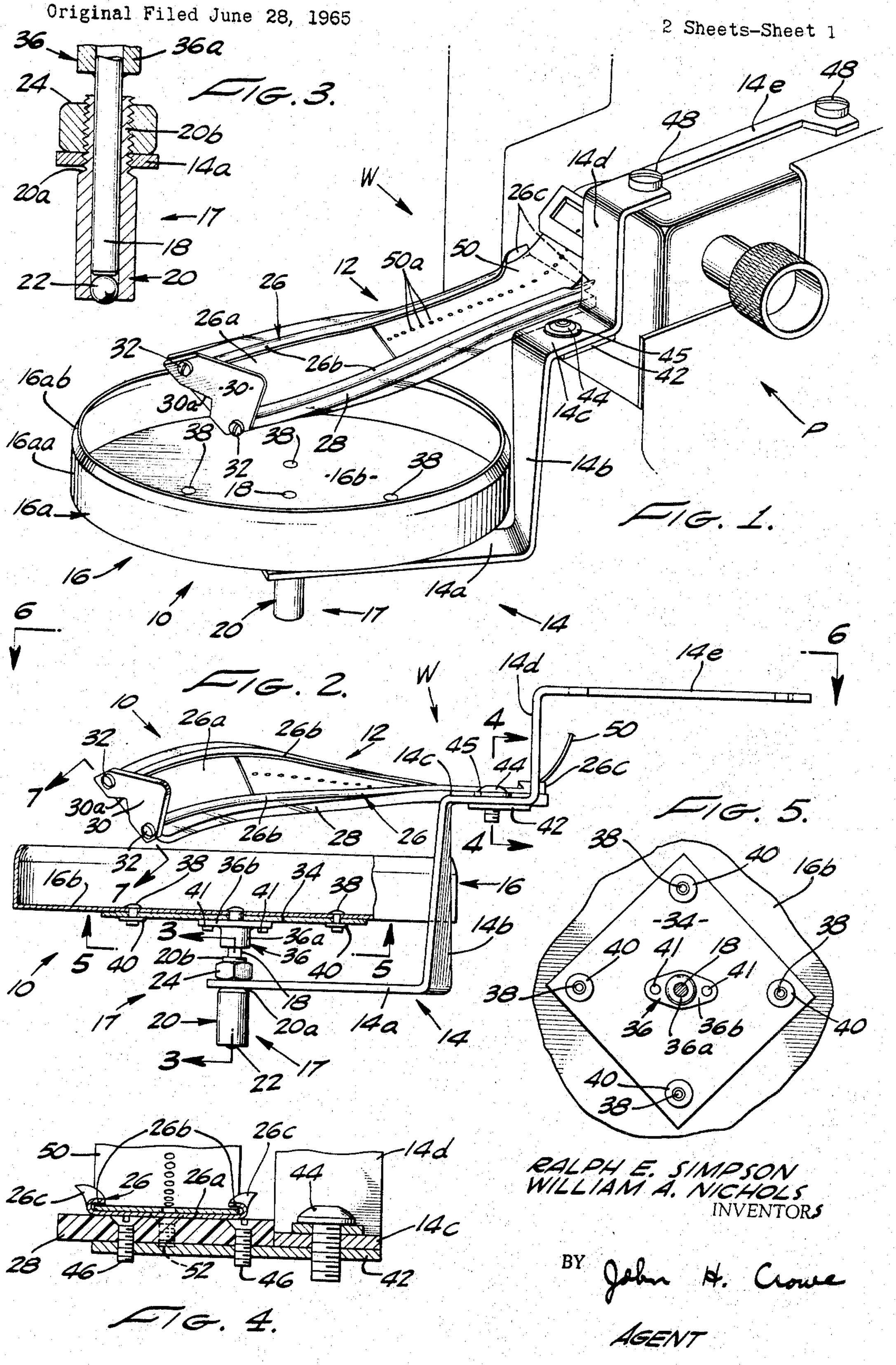
FIGURE 1 shows the winder in perspective, in operating posture and position and supported in tape receiving immediacy to a Perforator, a length of tape entering from the Perforator also being shown.
FIGURE 2 is an elevation of the winder, shown in partial section to better reveal its manner of construction, showing, also, a fragmentary section of feed tape in winder-entering relationship.
FIGURE 3 is an enlarged fragmentary view, mostly in section, showing bearing support means for a movable part of the winder, taken along line 3—3 of FIGURE 2.
FIGURE 4 is an enlarged, fragmentary view, mostly in cross section, of the tape receiving part of the winder, taken along line 4—4 of FIGURE 2.
FIGURE 5 is a fragmentary, sectional view, looking upwardly underneath the main body portion of the winder from a sectional plane coinciding with line 5—5 of FIGURE 2.
Figures 6, 7, 8, 9, 10:
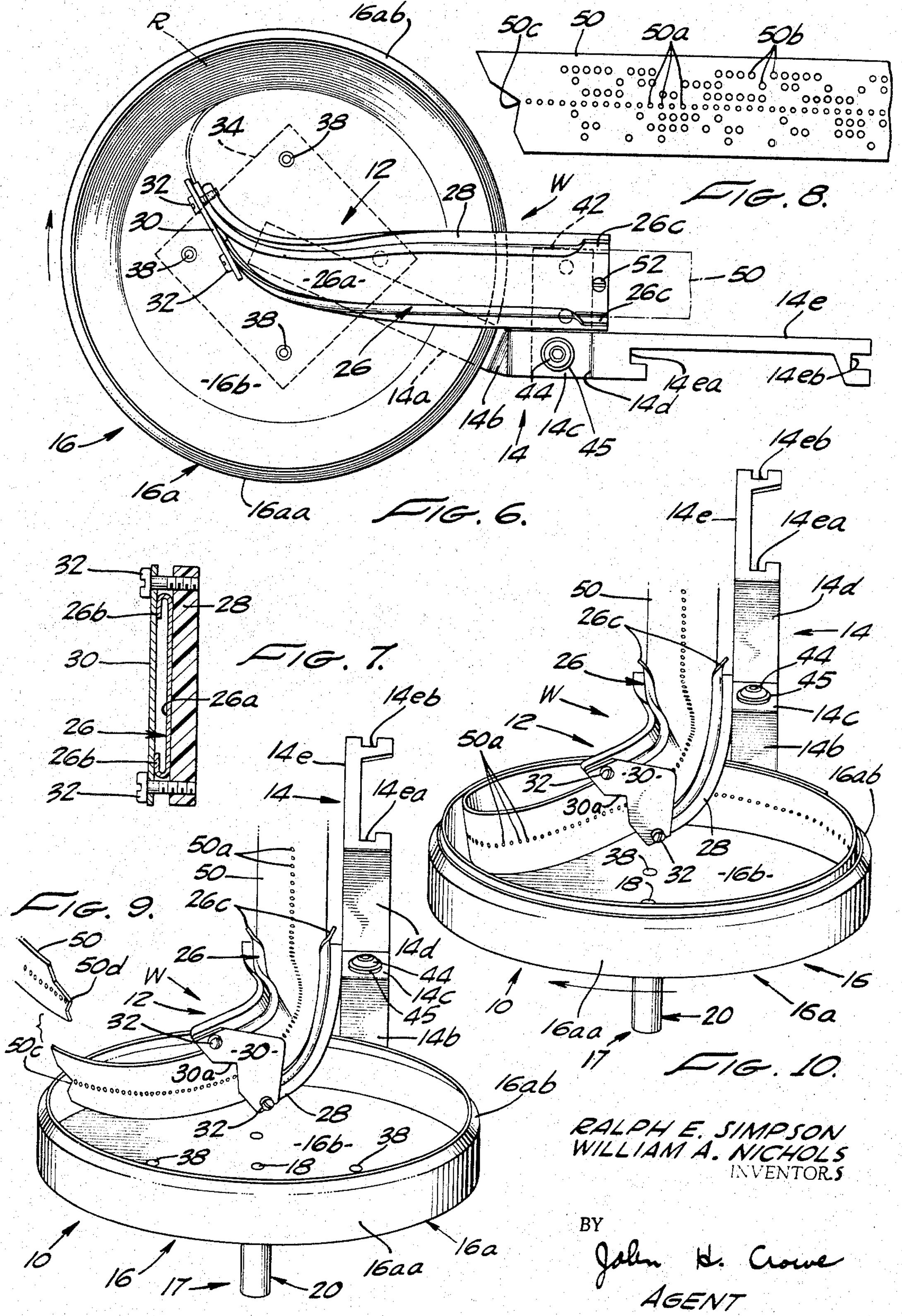

FIGURE 6 is a plan view of the winder in operation, taken along line 6—6 of FIGURE 2, but showing, additionally, a partially completed roll of tape formed thereby and a fragmentary section of feed tape integral with the roll, the roll and fragmentary section of tape being shown in phantom outline and the operating movement of the tape rolling mechanism of the winder being indicated by directional arrow means.

FIGURE 7 is an enlarged view, mostly in cross section and adjusted to the vertical for better illustrative effect, through the end portion of a tape routing guideway of the winder, taken along line 7—7 of FIGURE 2.

FIGURE 8 is a plan view, in enlargement over the common scale of FIGURES 1, 2 and 6, of a fragmentary section of paper tape of a type particularly adaptive to winding by the winder of this invention, the tape being shown with perforations such as those made by a Perforator (although no attempt has been made to duplicate actual perforation code patterns) and with one end cut in a severance pattern of peculiar significance as will later appear.

FIGURE 9 is a perspective view of the FIGURE 1 winder in operational setup and showing a length of paper tape feeding through the aforesaid guideway with its end heading toward the winding mechanism of said winder and showing, additionally, the aft end of a separate piece of tape severed from the feed tape by a severance blade appurtenant to the winder, the severed ends of the separate piece of tape and the feed tape being shown in offset proximity to contrastingly illustrate the differing, but mating, severance patterns therebetween.

FIGURE 10 is another perspective view of the winder, similar to the FIGURE 9 view but corresponding to a point later in time after the tape has been partially wound to illustrate the mechanics of the winding process.

Considering, now, the drawings in greater detail, there is shown, as previously indicated, a preferred embodiment of a winder W comprising a winding mechanism, indicated generally by the reference numeral 10; a guideway for the guidance of feed tape to winding mechanism 10, the guideway being indicated generally by the reference character 12; and a bracket 14 designed for attachment to a Perforator at one end and for supporting winding mechanism 10 at the other end.

Focusing first on winding mechanism 10 for purposes of this description, that unit consists of a tray 16 comprising the main portion thereof, and an understructure assembly 17 which serves to support the tray in horizontally rotatable suspension during operation of the winder. Tray 16 has a round, flat bottom **16*b* and a cylindrical side wall 16*a* rising upwardly around the periphery of said bottom to a height hereinafter indicated. The above language of reference to the upward direction of the side walls, as well as all other directionally definitive language relative to the winder or its parts to follow, is referable to the operating position of the winder, as illustrated in the drawings. Side wall 16*a* rises, for most of its height, vertically upwardly from the tray bottom, but it curves inwardly at its top to form an inturned lip 16*ab*** as shown.

Understructure 17, as here comprehended, includes a spindle 18 depending perpendicularly downwardly from the center of tray 16, and rooted at its upper end in a concentric hole in the tray bottom by welding means, as shown in FIGURE 2; a retaining sleeve 20 in which the spindle nests in rotatable relationship for a major portion of its length; a single ball bearing 22 disposed in the lower end of the sleeve, and kept from falling by an inwardly directed wall curvature which restricts the lower opening of the sleeve to a sufficient extent to prevent passage of the ball and provide a mating seat therefor; and miscellaneous associated hardware which will subsequently be described.

To strengthen the rooted connection between tray bottom **16*b* and spindle 18, and help preserve the perpendicular relationship between those parts to assure proper functioning of the winder, a square reinforcing plate 34, center-apertured to permit passage of the spindle, is laminatingly fastened to the bottom surface of the tray and a sleeve bracket 36, sized to receive the spindle in snug fitting relationship, is affixed to the underside of said plate. Spindle 18, as a consequence, passes upwardly through, in vertical succession, sleeve bracket 36, the center aperture of reinforcing plate 34 and the concentric opening in the bottom of tray 16** in which it is rooted by the previously indicated weld means.

Reinforcing plate 34 is fastened flat against the bottom of tray 16 by means of four corner rivets 38, which pass through both tray bottom and plate, and four cooperating washers 40, all as clearly depicted in the drawings and particularly FIGURES 2 and 5. Sleeve bracket 36 has a main sleeve porton 36a, through which spindle 18 passes, and an apertured flange portion 36b extending radially outwardly from the upper end of the sleeve portion. Flange portion 36b has a horizontal upper face coplanar with the upper rim of sleeve portion 36a, both of which fit flat against the lower surface of reinforcing plate 34. The bracket sleeve is fixedly secured in place by two studs 41 which are force fitted through two symmetrically positioned apertures in its flange portion, as illustrated, and two respectively aligned openings in reinforcing plate 34. It will be apparent that the described tray, reinforcing plate, sleeve bracket and spindle assembly turns as a unit upon rotation of the spindle in bearing sleeve 20. To provide additional assurance of such concert of action, spindle 18 is secured to sleeve bracket 36 at its lower sleeve end portion by welding means, as illustrated in FIGURE 3.

Bearing sleeve 20 has an upwardly sloping shoulder 20a in its upper portion, beyond which it is of reduced outside diameter. The reduced portion, hereinafter referred to as sleeve neck 20b, is externally threaded for a purpose hereinafter appearing.

Spindle 18 is rotatably supported within bearing sleeve 20 on the steel ball 22 resting at the lower end of its hollow center, in the manner illustrated in FIGURES 2 and 3. Bearing sleeve 20, is, in turn, supported by a horizontal leg 14a of bracket 14 (of subsequent description) with the aid of a lock nut 24 threaded for mating engagement with the threaded neck of said sleeve. Horizontal bracket leg 14a is simply a section of strap metal having a transversely central hole passing perpendicularly through its outer end portion, the hole being so sized and tapped as to mate with the neck of bearing sleeve 20 in threadable relationship.

The support for bearing sleeve 20 is achieved by screwing its threaded neck upwardly as far as it will go through the tapped hole in bracket leg 14a, and then tightening lock nut 24 down on that portion of the sleeve neck upwardly protrusive through said hole to binding contact with the upper surface of the bracket leg. When the parts are so assembled, the tray and understructure of winding mechanism 10 are supported by bracket 14 which, when operatively attached to the Perforator in the manner illustrated in FIGURE 1 and subsequently to be described, holds bearing sleeve 20, which, in turn, holds spindle 18, in vertically upright position, thus assuring horizontal disposition of tray 16.

Because spindle 18 is supported on ball 22 in bearing sleeve 20, and is rotatable within that sleeve, tray 16 can be made to revolve in turntable-like fashion. Furthermore, the frictional resistance between the spindle and the bearing sleeve, as those skilled in the art will appreciate, is so low that little force is required to start the tray rotating, and to maintain it in motion thereafter. Tray 16, and the above-described hardware means reinforcing the physical connection between it and spindle 18, are preferably of lightweight metal, as, for example, aluminum, construction. Where the tray is so constructed, its relatively low weight is an additionally contributing factor to the ease with which it can be induced to rotate, and thereafter continued in rotation, upon the application of only slight external forces. Bearing sleeve 20 is preferably of a suitably characterized metal or alloy, such as bronze, or equivalent metallic material of any type conventionally employed for the manufacture of bushings, or products of a similar moving-metal-contact applicability.

Bracket 14 is of strap metal construction and of generally stepped profile, having three horizontal sections and two vertical ones. It is pointed out, in this connection, that our previous comments relating directionally definitive statements in this description to the operating position of our winder, as shown in the drawings, are equally applicable to statements of positional (horizontal, vertical, etc.) orientational status of the winder, or any of its component parts, appearing herein without further qualification. Leg 14a of the bracket, already referred to, is a section of sufficient length to extend from underneath the center of tray 16 to a point clear of its outer edge in the direction of Perforator P. From that point, outboard of the tray, bracket 14 bends through a 90° angle and then rises vertically to a bend point higher than the top edge of the tray wall, to form a vertical section 14b. Section 14b has a slight twist, for a purpose hereinafter disclosed, this being illustrated particularly well in FIGURES 1, 2 and 6.

From the upper bend point of section 14b, the bracket progresses again in the direction of the Perforator, through a relatively short section 14c, serving primarily to support guideway mechanism 12 in a manner hereinafter explained, from whence it extends upwardly through a 90° bend to form a relatively short vertical section 14d which fits flush against the upper part of one of the Perforator walls, as shown in FIGURE 1. Finally, the bracket bends over the top edge of said wall and extends inwardly a sufficient distance to permit its fastening to the top of the Perforator, in the manner illustrated in FIGURE 1, and thereby form still another horizontal section 14e.

While, as previously indicated, the bracket 14 configuration is exemplary only, and not limitative, of suitable bracket designs within the scope of our invention, it is felt to represent a design of wide potential use, barring certain Perforator model changes of such character as to necessitate an altered bracket structure or configuration. One skilled in the art would have no difficulty, however, in improvising such a bracket for use on a Perforator, or equivalent tape perforating instrument, in the light of present teachings, should this become necessary. For these reasons, no bracket design alternative to that of bracket 14 is illustrated or described herein. The above assertion relative to the lack of difficulty of improvisation of a bracket for an altered Perforator model applies with as equal force to presently existing, as to future-born, Perforators.

Returning now to consideration of the configurational particulars of bracket 14, horizontal section 14e thereof has cutaway portions (including two transversely centered, longitudinally aligned notches 14ea and 14eb, respectively) so patterned as to permit its easy notch embrace, in the manner indicated by FIGURE 1, of the shanks of two machine screws 48 fitted into existing tapped openings in the top of the Perforator. The bracket is designed to cooperate with the screws 48 so located, the openings having been prelocated in the Perforator top for a purpose not presently pertinent. Bracket 14 is locked in place in its double embrace of the screws by tightening of the latter head-flush against its section 14e, as shown in FIGURE 1. When so locked, the bracket is properly positioned for service in the practice of our invention.

When bracket 14 is locked to Perforator P in the above-described fashion, winder W is in proper position to receive and wind perforated tape from the Perforator. A corner portion only of the Perforator is shown, this being sufficient to illustrate the manner in which the winder is fastened thereto and the path of the perforated tape from it to (and into) the winder. As FIGURE 1 shows, the tape exits from the Perforator at a level below the surface of attachment of section 14e of bracket 14 thereto. It will be apparent that winder W must somehow receive the tape from the Perforator and guide it to winding mechanism 10 before it can function properly and it is to this end that horizontal section 14c has been designed into bracket 14. Section 14c is, as FIGURE 1 shows, positioned slightly below the exit level of the tape from the Perforator and it serves to support the tape feed end of guideway 12 in a manner presently to be described. All Perforator tape shown in the drawings is denoted by the reference numeral 50, even though separate pieces, or sections, of the tape are thereby depicted.

Tape guideway 12 is of simple, but uniquely configured, construction. Briefly, it comprises a metallic tape channel 26, having a relatively wide bottom 26a and upwardly curving sides which culminate in inturned lips 26b overlying the two respective edges of the channel bottom; an elongated plastic bed 28 of conforming shape to the bottom of tape channel 26 against which the latter is overlying supported; a tape severance blade 30 disposed crosswise of the tape channel at its discharge end and in overlying relationship thereto; and miscellaneous items of hardware, hereinafter described, for fastening the above-identified parts together. The width of the bottom of channel 26, and the spacing between its inturned lips 26b and said bottom are tailored to provide a confining, but nonbinding, guideway for the passage of tape therethrough. The inturned lips 26b of the tape channel extend sufficiently far over the edges of tape disposed therein to prevent it from popping out of the channel.

As the drawings illustrate, bed 28 is made of a clear plastic such as Plexiglas. The bed, however, is not limited to such a material of construction and any other suitable material, such as a nontransparent plastic, a metal or alloy, wood, or the like, can be substituted therefor if desired. As the drawings also show, bed 28 is permanently twisted through an angle of about 90 degrees, being substantially horizontally disposed at its tape receiving end adjacent Perforator P and twistingly progressing therefrom to a discharge end of more nearly vertical than horizontal orientation, but angled downwardly to some extent for a purpose hereinafter appearing. The metallic tape channel 26 being, as indicated, in closely overlying relationship to bed 28, assumes the same twisted configuration as the bed, as a result of which it receives the incoming tape from Perforator P in horizontally flat form and discharges it to winding mechanism 10 in vertically disposed orientation but angled downwardly toward tray 16 of the winding mechanism. The progress of the tape after its discharge from channel 26 will be described hereinafter.

Inturned lips 26b of the guideway channel bend upwardly and outwardly, as shown at 26c, at the tape receiving end of the channel to form a funnel-like channel mouth for easy guidance of the entering end of a length of feed tape therein. Channel bed 28 is of greater width than guideway channel 26 and the latter is transversely centered thereon, being thus protected along its lateral edges by the resulting bumper-like edge projections of the bed. The additional width of the bed also provides an anchoring base for attachment of the severance blade 30 which is, as previously indicated, disposed transversely across, and above guideway channel 26 at its tape discharge end.

Severance blade 30 is fixedly secured in place by means of two machine screws 32 which pass through mating holes therefor in its respective ends and are threadedly engaged with properly sized, tapped and positioned anchoring holes therefor in channel bed 28. As FIGURE 7 shows particularly well, screws 32 are laterally spaced a sufficient distance to clear the curving side walls of guideway channel 26 and they are sufficiently tightened to press the severance blade flush against the upper surfaces of inturned lips 26b of the channel, thereby serving to clamp the channel and underlying bed 28 firmly together. Screws 32, in addition to supplying clamping pressure to the tape channel and its support bed, also, by their channel flanking presence, serve to prevent sidewise migration of the channel and thereby insure a stronger and more durable guideway structure.

Guideway 12 is, as the drawings clearly show, supported in suspension above the winding mechanism 10 of winder W. Support for the guideway is furnished by bracket 14 through a connecting support member 42, as illustrated particularly well in FIGURE 4. As FIGURE 4 shows, support member 42 is a relatively short flat strip of metal positioned flush against the under surface of leg 14c of said bracket with a major portion of its length projecting from thereunder in the direction of the effluent tape from Perforator P. Cross piece 42 is fixedly secured in its underlying relationship to bracket leg 14c by means of a set screw which passes through matingly threaded holes so positioned in those two members as to bring them together in the described, and illustrated, fashion upon tightening of the set screw therein. The set screw is tightened from the top with its head flush against a washer 45 positioned as shown in the drawings.

Guideway bed 28 rests on that portion of cross piece support member 42 projecting outwardly from under bracket leg 14c. The guideway bed is fixedly secured to the outwardly projecting portion of cross piece 42, with a lateral edge abutting the facing lateral edge of bracket leg 14c, as illustrated, by means of two countersunk screws 46 which pass through properly aligned and threaded holes in the guideway bed and cross piece. This fastening arrangement is shown particularly well in FIGURE 4. Screws 46, being countersunk, do not project above the upper surface of the guideway bed to interfere with the fit of the bottom of guideway channel 26 against said bed.

Guideway channel 26 is secured at its forward end to bed 28 by means of a countersunk screw 52 tightened in a tapped hole with mating threads in the bed. The countersunk screw head is flush with the upper surface of the bottom of guideway channel 26 to avoid interference with the smooth flow of tape thereover. As FIGURES 4 and 8 show particularly well, countersunk screw 52 is situated at the very forward end of the guideway channel and positioned transversely centrally therein.

As previously pointed out, winder W functions in the position of fixed attachment to Perforator P illustrated in FIGURE 1. To initiate the winding operation, the moving end of a ribbon of perforated tape emerging from the Perforator is funnelled into guideway channel 26 at its wide-mouth end characterized by the outturned portions of lips 26b (as shown at 26c), after which the tape progresses through the channel and out of its discharge end adjacent severance blade 30. When the front end of the tape emerges from the guideway channel, it is angled downwardly toward tray 16 and, by virtue of the twist in the channel, in a curving direction clockwise around the tray. Also, as a result of the length, configuration and location of guideway 12, and the height adjustment of its discharge opening, the front end of the tape emerges therefrom at a point sufficiently close to the tray side wall to impinge upon the inturned edge of lip 16ab of the wall as it (the tape) proceeds downwardly in its path of travel.

The angle of approach of the front end of the tape to the lip of the tray side wall is, as indicated by FIGURE 9, such that the actual point of contact between the tape and the lip affords the latter an opportunity to "hold" the tape to keep it from popping out of the tray. After the moving tape end contacts the lip of the side wall, the friction therebetween is sufficient, as a result of the light weight of the tray and the low frictional resistance in its ball bearing support system, to start the tray rotating in a clockwise direction. The end of the tape thereafter rides in contact with the inturned lip of the tray side wall as the tray rotates and the ribbon of following tape, by virtue of its flow path from guideway 12, flattens itself against the moving side wall of the tray, at the same time contributing drive energy thereto.

The continual inpouring of energy from the moving tape keeps the tray revolving in turntable fashion. The energy for the tray movement is, thus, supplied by the Perforator itself and, as will be apparent to those skilled in the art, in the form of a normally wasted energy byproduct of the perforating procedure. This pinpoints another advantage, not heretofore mentioned, of our novel tape winder, namely, the utilization of energy, otherwise wasted, for the powering of our winding mechanism. As those skilled in the art will appreciate, the utilization of such waste energy for tape winding purposes has not heretofore been possible because of its low order ineffectiveness for the powering of conventional reel type winders. Our winder, however, is, because of its unique construction and manner of operation, peculiarly adapted to convert such weak energy to useful winding work of the kind and quality taught herein.

As long as the tape continues to feed through guideway 12 and into tray 16, it continues to impinge upon the inturned upper edge of the tray side wall at about the same distance from the guideway discharge position as that of the impingement of the end of the tape originally contacting the side wall. The continuing impingement of the tape on the tray side wall furnishes sufficient energy to keep the tray rotating at a speed comportive with the rate of tape discharge from the guideway. As a result, the tape flattens itself against the side wall, after its moment of impact with the edge of inturned lip **16*ab*, thereafter riding around with the tray, as it moves, with a minimum of slippage. As the tape continues to feed into the tray, and keep it rotating in the described manner, it distributes itself around the rotating wall until one complete loop is formed. After this, continuation of the tape inflow results in continued rotation of tray 16** but the tape now deposits itself against the previously formed loop, or layer thereof around the tray side wall, rather than against the side wall itself.

The above-described process goes on, with subsequent loops of tape laminating themselves against previously formed ones in the indicated manner, as long as tape inflow into tray 16 continues. As a result, the tape shapes itself into a roll with a hollow center, the roll building inwardly into the center, rather than outwardly, as the shaping process continues. The described roll-shaping technique is illustrated in FIGURES 6 and 10, the latter showing the tape disposition as it appears shortly after the first loop of tape has formed in tray 16 and the former showing it as it appears after the formation of a sizable roll of tape in the tray (the roll being shown in phantom outline and designated by the reference character R).

It will be apparent that at some point shortly after initial contact of the front end of the tape with the edge of inurned lip **16*ab* of the tray wall, the weight of the accumulating tape causes it to settle to bottom edge abutment with tray bottom 16*b*. It will also be apparent that the height of tray wall 16*a* is such as to provide an effective barrier against the escape of tape 50 from winding mechanism 10**, although it is not higher than the tape standing on edge, as FIGURE 10 illustrates.

The design requirements for effective operation of winding mechanism 10, the manner in which the involved forces combine to produce the above-described winding action, and the other particulars of successful operation of our winder are believed sufficiently clear from the foregoing description of the winding apparatus and its method of operation, considered in conjunction with the accompanying illustrative drawings, to teach those skilled in the art all that is necessary for the construction and use of a winder in accordance with this invention. Consequently, no attempt will here be made to analyze the force system brought into play by winding mechanism 10 in operation or to pin down preferred angles of tape approach to the wall of tray 16, preferred tray diameters, and other design particulars.

While a certain amount of experimental effort might be required in some cases to arrive at a winder design of optimum efficacy, such efforts will tax, at most, only the patience, and not the ingenuity, of one skilled in the art attempting to follow the winder construction teachings herein. Suffice it to say, relative to the winder design requirements of this invention, that the relative orientation of tray and guideway should, for best results, conform generally to that illustrated in FIGURE 6, which shows guideway 12 extending generally radially inwardly over the tray to a point in its twist at or near which it thereafter begins to angle downwardly toward its discharge end (which point occurs near the axis of the tray), after which the guideway curves away from the tray diameter coincident with its radial approach path across the tray in such a direction as to route the tape from its discharge end to tangential contact with the tray wall in the clockwise direction.

The guideway is preferably made of such length as to station its discharge end slightly short of a half-radius distance from the axis of tray 16, as illustrated in FIGURE 6, although any discharge positioning of the guideway consistent with proper functioning of the winding mechanism, as taught herein, can be employed within the scope of our invention. The disadvantage of a guideway discharge opening too far removed from the tray axis results in minimum tape roll thickness since, as will be obvious, the tape roll formation in the tray cannot exceed a roll thickness greater than the distance between the end of the tape guideway and the side wall of the winding mechanism tray. This can be readily understood by reference to FIGURE 6, which shows tape roll R at a stage of its formation at which its thickness is substantially less than the distance between the discharge end of guideway 12 and tray wall **16*a*. It will be apparent from this illustration that tape roll R will, so long as tray 16 continues to rotate under the impetus of moving tape feed from guideway 12, continue to grow in thickness, building loop upon loop from the outside in, until its thickness fills the space between the discharge end of the guideway and the tray wall to such an extent that the flow path of the feed tape is no longer conducive to proper winding energy transmission to winding mechanism 10**.

To assure the above-described, and drawing illustrated, extension pattern of guideway 12 over the circular area of tray 16 in radial relationship therewith, vertical leg **14*b* of the winder bracket has a slight, permanent, clockwise twist, as shown particularly well in FIGURES 1, 2 and 6. The amount of twist is slight, as the drawings illustrate, being just sufficient to swivel tray 16 in a clockwise direction, as viewed in FIGURE 6, to the guideway underlying axis position shown. Here again, as in the case of all other design particulars of the winder, the amount of twist in the leg, or section, 14**b of the bracket for optimum operating efficacy of the winder is a matter of easy determination by one skilled in the art having the present teachings to guide him, and its limits will not be speculated upon here.

Suffice it to say in conclusion, on the general subject of design particulars, that the angular relationships between, relative size differences of, spacing between, etc., the parts of our winder as depicted in the accompanying drawings substantially duplicate angular and size difference relationships of a working embodiment of our winder which we have constructed and used for tape winding purposes in a newspaper composing room with excellent success. The working embodiment performed in exactly the manner described herein on a great number of separate occasions stretching over a period of several weeks duration. While the drawings do not show the working embodiment and its component parts in true size scale, FIGURE 8 of the drawings, as filed, shows a life-size fragmentary section of tape exemplary of that which the winder was specifically designed to handle. Comparison of the size of the tape in FIGURE 8 with that of the tape in the various other views of the drawings, will thus give a good idea of the degree of scale reduction of the drawings from that of our working embodiment of the winder and thereby convey a reasonably accurate impression of the size of our winder. The invention is not, of course, limited to winders of size equivalency to the described working embodiment thereof, but that embodiment is felt to fairly represent a practical size of widely anticipated use in a field in which our winder will, we believe, find wide acceptability.

From the foregoing description of the structural character and mode of operability of the pictured embodiment of our winder, considered in conjunction with the accompanying drawings, it will be apparent that the winder succeeds in winding a longitudinally moving tape in roll form from the outside in, thereby producing a roll which can be unwound from the outside in the same order in which it was rolled and, in so doing, satisfying the principal object of this invention. After the desired length of tape has been wound, it is a simple matter to sever it from the master tape source and remove the roll from the tray of the winding mechanism for transmittal to a computer reader, or elsewhere, as desired.

In the above connection, and referring again to the drawings for ease of description, tape 50 is easily severed by tearing it outwardly against the leading edge of severance blade 30. This tearing movement produces a tear line of such character as to distinguish the aft end of the severed tape from the forward end of the remaining tape in the guideway. Thus, as FIGURE 9 illustrates particularly well, severance blade 30 has a V-shaped indentation 30*a* intermediate its ends which produces an aft end configuration on the severed tape with a pointed projecting portion 50*d* and a forward end configuration on the remaining feed tape with a matching indentation 50*c*. The front end indentation 50*c* of the feed tape is functionally useful in that it makes a convenient seat for entrapment of inturned lip 16*ab* of the tray wall as the tape end comes into contact therewith. Such entrapment minimizes the possibility of tape escapement over the top of the tray wall before a sufficient length has been fed into the tray to act as ballast for the prevention of such an event. Consequently, it is usually preferable, although not necessary, to tear off a short length of the feed tape as it first emerges from the discharge end of the winder guideway in order to provide the advancing tape with the described front end indentation.

Another functional aspect of the severance blade tear pattern is that it provides a means of instantly distinguishing the front and aft ends of a tape roll. The useful ramifications of such an instant tape end identification means will be readily apparent to those skilled in the art. The centerline of small round perforations in tape 50, indicated at 50*a* on the drawings, and the other, larger perforations distributed either side of said centerline (as shown at 50*b* on FIGURE 8) are all punched in the tape by the punch block of Perforator P and do not touch the essence of this invention, hence will not be discussed herein.

We have discovered that our winder operates effectively even when the tape being wound is not integral with the moving tape power source. Thus, the moving tape can be completely separate from a length of tape ahead of it in the guideway channel, yet exert adequate activating force to the winding mechanism tray therethrough to wind the disconnected tape in the tray, after which the moving tape, we have found, follows the former into the same roll and continues to wind itself therearound in the same manner. This is made possible by the ease with which the winding mechanism turns in its bearing support assembly of previously detailed description. To minimize bearing friction in the winder, the involved bearing surfaces can be lubricated by the application of oil, or other suitable lubricant, or alternatively, oil impregnated bearing parts can be used.

We have heretofore emphasized the applicability of our winder for the winding of perforated tape copy of the type prepared and used in newspaper composing rooms for the automatic operation of linecasting machines. We have also placed special emphasis on the applicability of the winder for the automatic winding of tape copy from a Perforator. We wish to now make it clear, however, that the winder's range of usefulness is not so limited and that it has applicability for the winding of perforated tape from any source, regardless of the end use of the tape. Thus, perforated tape from a machine other than a Perforator can be wound as easily as Perforator tape by our winder when it is provided with support means adapted to properly position it to receive the tape for winding purposes.

Perforated tape-controlled machine shop and manufacturing operations such as drilling, milling, boring, tapping, reaming, and turning, operations are becoming more and more prevalent, and coded tape has been a familiar working tool to computer technicians for a relatively long period of time. In addition, banks, police departments and telephone companies now have occasion to use perforated tape in various phases of their operations. Perforated tape intended for any of the foregoing, or other, applications can, of course, be processed by a winder within the scope of our invention where the tape movement is conducive to such processing in accordance with present teachings.

Our automatic tape winder is not limited, servicewise, to the winding of conventional paper tape, such as that heretofore exclusively contemplated, and it may be utilized for the winding of any ribbon-like tape or film under moving impulsion of a quality suitable for activation of its winding mechanism. While such tapes or films are, insofar as we are aware, normally perforated in one way or another for reasons of no present significance, the resulting perforations are in no way essential to proper functioning of our winder. Hence, the winder serves equally well for the winding of non-perforated tape moving under the influence of a suitable actuating force as it does for the winding of a perforated tape, such as tape 50, under the influence of a similar force.

While our winder has been heretofore described primarily in terms of reference to its drawing-illustrated embodiment, there are, of course, many possible structural variants of that embodiment, differing numerously in noncritical features, materials of construction, etc., therefrom, within the scope of the present invention. Certain examples of the kind of structural variation here contemplated have already been given, and numerous others will be suggested to those skilled in the art by the present teachings. In further exemplification of this kind of permissible structural variation, a vertical cylindrical wall could be substituted for the lipped tray wall of the pictured version of our winder within the spirit and scope of our invention. A tray wall with an inturned lip, such as lip 16*ab*, is preferable to a straight vertical one, however, since the lip aids in captivation of the tape in the tray by deflecting it in ways obvious to those skilled in the art from the foregoing description of winder W and its mode of operation.

In further illustration of the many permissible structural alterations of the illustrated winder W within the scope of our invention, tray 16 can be replaced by any suitably equivalent tape receiving and roll containing means with an encircling barrier against which the tape feed to the winder can be deposited in the edge standing manner in which it is deposited against tray side wall 16*a*, and horizontal surface support, or floor, means so disposed, relative to the barrier, as to provide a floor surface for support of the lower edge of the tape thusly deposited.

The floor means is specifically exemplified by bottom 16*b* of tray 16 of the pictured embodiment of the invention. It will be apparent that this rather broad definition of tray 16 equivalents includes numerous structural species, some varying widely from others in appearance but all possessing a use capability for present purposes similar to that of tray 16. Thus, the tray 16 equivalent can have its encircling barrier and floor means vertically separated; the latter extending outwardly beyond the barrier or extending annularly inwardly therefrom to provide an annular, rather than a continuous tray-bottom-like, surface for support of the tape deposited thereon during operation of the winder; or any one or combination of a number of features which would set it apart from tray 16 in appearance, yet not obviate its functional equivalency thereto. The same thing holds true with respect to the bearing support structure for the tray or its equivalent. Thus, any means capable of rotatably supporting said tray (or its equivalent) in such fashion that it is responsive to applied force from tape entering the winder in the same way tray 16 of the pictured embodiment of our winder is responsive to such force can be substituted for its drawing-illustrated counterpart within the scope of our invention.

As previously indicated, the action of the winding mechanism assembly of our winder, as exemplified by tray 16 and its cooperative understructure of above decription, is like that of a turntable. Consequently, and in view of the many possible winding mechanism embodiments within the scope of our invention, of which only a few specific examples can here be given, that term ("turntable") or its variant equivalent such as turntable means, will be employed in the following claims to generically denote all winding mechanisms so constructed as to perform essentially in accordance with the necessary turntable-like requirements of our invention, as taught herein. Accordingly, except as there qualified, the turntable terminology of reference to our winding mechanism in the claims will import such mechanisms having a floor adapted to rotate horizontally and at least the necessary bearing, support, and/or other hardware, regardless of its character, structural or otherwise, to permit such floor rotation of a type compatible with the service requirements of the claimed winder.

In clarification of the meaning of certain other language employed above and in the claims to follow, although such is hardly necessary as will be seen, it is pointed out that the term "longitudinally moving," as applied to the moving tape feed to our winder, is intended to signify movement in the direction of the longitudinal axis of the tape. This does not mean, however, that the tape must be moving *only* in that direction and so long as it has a component of movement so oriented and of sufficient motivating force to satisfy the power requirements of our winder, the tape is "longitudinally moving" for purposes of this invention. Additionally, the term "circular barrier," as employed herein to generically connote the tape confining barrier on our turntable winding mechanism, as specifically exemplified by tray wall 16*a* on winding mechanism 10 of the drawings, includes within its meaning any barrier adapted to confine the tape in such as a way as to comport with proper functioning of our winder in accordance with present teachings. Thus, if a technically noncircular barrier, as for example an elliptical or polygonal barrier, adequately serves the purpose of our invention it is intended to fall within the scope of the aforesaid term, in spite of its literal noncompliance therewith.

One additional term employed above, and in our claims, is perhaps worthy of comment, this being the adjective "tangential" or its adverbial counterpart "tangentially," to indicate the direction of force application from the moving tape contacting the circular barrier of our turntable winding mechanism to said barrier. Our meaning here, as will be clear from an understanding of the manner of operation of our winder, is the common sense one of a force direction on the circular barrier such as to cause it to rotate. If this is not in some, or even all, cases tangential, we apologize but feel justified in our use of the term for lack of a better one to broadly connote the meaning thereby intended.

In final illustration of additional ways in which our winder can deviate from its drawing-embodiment form and still remain within the scope of this invention, it is pointed out that there is no necessity for the winding mechanism of the device to rotate in the clockwise direction, as does winding mechanism 10 of winder W, and it could just as easily rotate counterclockwise if desired. The latter type of performance would require a change in tape guideway design, but one of so simple a nature that the routineer in the art would have no difficulty in making it in the light of present teachings. In like vein, there is no need for the tape severance blade at the discharge end of the guideway to be notched, as illustrated in the drawing, nor, in fact, is there any real necessity for the presence of a severance blade at all, although both the blade and its notched configuration are preferred winder features for reasons explained at some length above.

As in most patent disclosures, language of generic intent but literal limitation to particular elements or parts of our drawing-illustrated winder, sometimes even to the point of reference numeral limitation, have sometimes hereinabove been employed. Where such generic intent is obvious, as it normally is, the language in question should be accorded a breadth consistent therewith rather than construed in its narrow literal sense.

In brief summary, we have herein shown and described in considerable detail what we believe to be the preferred embodiment of our invention. There are, however, many theoretically possible variations of that embodiment and it is emphasized that all such which are characterized by structural and operational consistency with the essence of our invention as taught herein fall within its scope, so long as they are encompassed by the following claims.

We claim:

1. Tape winding means for automatically winding longitudinally moving tape, comprising:
   (a) tape receiving turntable means having an upstanding circular barrier adapted to retain said tape in edge-standing orientation within its confines when the lower edge of said tape is supported at a level compatible with such retention, and floor means adapted to support said lower edge of said tape at said level;
   (b) means adapted to support said turntable means in substantially floor-horizontal orientation and accessibly positioned relative to a source of said longitudinally moving tape;
   (c) guideway means adapted to receive said longitudinally moving tape and deliver it to said turntable means, said guideway means having a discharge end situated substantially above the floor means of said turntable means and disposed substantially radially inwardly from the upstanding circular barrier of said turntable means, and being so configured as to guide the tape through a twist from a substantially flat and horizontal to a substantially vertical position with one edge above the other and a curving turn to one side which substantially changes its direction of movement, then discharge it in a downwardly angled path of approach to said turntable means;
   (d) auxiliary means adapted to secure the means of sub-paragraphs (a), (b) and (c) in mutually cooperative positional relationship;
   (e) said means of sub-paragraphs (a), (b) and (c) cofunctioning, when thus secured, to effectuate guidance of said longitudinally moving tape through said guideway means and onto the floor means of said turntable means in edge-standing orientation, within the confines of, and in a curving path of convergence with, said circular barrier;

(f) whereby force is transmitted from the moving tape to said barrier, thereby causing the turntable means to rotate for as long as the tape continues to discharge from said guideway means;

(g) and whereby the moving tape, after transmitting said force to said barrier, rides around with said turntable means in lower edge-contact with its floor means, thereby forming spiralling coils which build inwardly to form a roll.

2. The tape winding means of claim 1 in which said turntable and guideway means are so spaced and positioned as to permit removal of a roll of tape, formed as indicated in sub-paragraph (g), from the former without any necessity of moving either relative to the other.

3. The tape winding means of claim 1 in which the tape receiving turntable means comprises:

(a) a round tray having a flat bottom, comprising said floor means, and a peripheral side wall, comprising said upstanding circular barrier, vertically disposed for at least most of its height when said tray is horizontally disposed;

(b) spindle means fixedly secured to the center of the bottom of said tray and depending vertically downwardly therefrom when said tray is horizontally disposed; and (c) bearing support means adapted to receive said spindle means and support it, and said tray, in rotatable relationship when the latter is horizontally disposed, whereby the tray is freely horizontally rotatable when the spindle is so supported.

4. The tape winding means of claim 1 in which the means of subparagraph (b) adapted to support said turntable means comprises:

(a) a holding bracket with a first section suitably constructed for fastening attachment to a tape-perforating instrument; and (b) a second section adapted to secure said turntable means in substantially floor horizontal and tape accessible positions when said first section is fastenably attached to said tape-perforating instrument.

5. The tape winding means of claim 1 in which said guideway means comprises:

(a) a guideway channel adapted to receive longitudinally moving tape and deliver it to said turntable means, said channel being so sized and configured as to permit loosely sliding travel of the tape therethrough, yet sufficiently confining to prevent escape of said tape therefrom during its travel; and (b) support and positioning means for said channel.

6. The tape winding means of claim 5 in which said guideway means is a thin metallic member with a flat bottom and integral side walls curving into inturned flanges which extend towards one another.

7. The tape winding means of claim 3 in which the peripheral side wall of said round tray is convergent at the top to form an inturned lip around its free edge.

8. The tape winding means of claim 1 having a tape severing blade secured to said guideway means adjacent its discharge end, said blade having a cutting edge lying in a plane substantially parallel with the path of the tape being fed through the guideway means.

9. Tape winding means for automatically winding longitudinally moving tape, comprising:

(a) tape receiving turntable means comprising a round tray having a flat bottom and a peripheral side wall vertically disposed for at least most of its height when said tray is horizontally disposed; spindle means fixedly secured to the center of the bottom of said tray and depending vertically downwardly therefrom when said tray is horizontally disposed; and bearing support means adapted to receive said spindle means and support it, and said tray, in rotatable relationship when the latter is horizontally disposed, whereby the spindle means and tray are freely horizontally rotatable when the former is so supported;

(b) the peripheral side wall of said tray comprising a circular barrier adapted to retain said tape in edge-standing orientation within its confines when the lower edge of said tape is supported on the bottom of said tray;

(c) means adapted to support said turntable means in substantially tray-bottom horizontal orientation and accessibly positioned relative to a source of said longitudinally moving tape, comprising a holding bracket with a first section suitably constructed for fastening attachment to a tape-perforating instrument, and a second section adapted to secure said turntable means in the above-indicated tray-bottom horizontal and tape-accessible position when said first section is fastenably attached to said tape-perforating instrument;

(d) tape guideway means comprising a guideway channel adapted to receive longitudinally moving tape and deliver it to the tray of said turntable means from a discharge end situated substantially above the flat bottom of the tray and disposed substantially radially inwardly of its peripheral side wall, said channel being so sized and configured as to permit loosely sliding travel of the tape therethrough, yet sufficiently confining to prevent escape of said tape therefrom during such travel, and support and positioning means for said channel; and (e) auxiliary means adapted to secure the means in the foregoing subparagraphs in mutually cooperative positional, and fixed spatial, relationship;

(f) said means of said foregoing subparagraphs being so sized, configured and function-coordinated when thus secured, and when the first section of the holding bracket of subparagraph (c) is fastenably attached to a tape-perforating instrument, as to guide longitudinally moving tape from the tape-perforating instrument through said guideway means to the tray of said turntable means and discharge it thereonto, in edge-standing orientation, within the confines of, and in a curving path of convergence with, the peripheral side wall of said tray;

(g) whereby force from the moving tape is transmitted tangentially to the peripheral side wall of said tray thereby causing said tray to rotate so long as the tape discharge from said guideway means continues;

(h) and whereby the moving tape, after being deposited on the tray and transmitting said force to the peripheral side wall thereof, rides around with said tray in lower edge contact with its bottom, thereby forming spiralling coils which build inwardly to form a roll;

(i) the tray and guideway means being so positionally oriented, relative to each other, as to permit removal of a roll of tape so formed from the former without positional change of the latter, said holding bracket being of strap metal construction with said first and second sections thereof integral with an interconnecting portion of at least partially vertical orientation during use, said interconnecting portion having a permanent twist of vertical direction and such degree of magnitude as to so position the tape receiving turntable means secured by said second section of the holding bracket that the round tray of said turntable means is in radial coincidence with the linear direction of tape feed from the tape-perforating instrument to which said first section of the holding bracket is attached for operation of the tape winding means.

10. Tape winding means for automatically winding longitudinally moving tape, comprising:

(a) tape receiving turntable means comprising a round tray having a flat bottom and a peripheral side wall vertically disposed for at least most of its height when said tray is horizontally disposed; spindle means fixedly secured to the center of the bottom of said tray and depending vertically downwardly therefrom when said tray is horizontally disposed; and bearing support means adapted to receive said spindle means and support it, and said tray, in rotatable relationship when the latter is horizontally disposed, whereby the spindle means and tray are freely horizontally rotatable when the former is so supported;

(b) the peripheral side wall of said tray comprising a circular barrier adapted to retain said tape in edge-standing orientation within its confines when the lower edge of said tape is supported on the bottom of said tray;

(c) means adapted to support said turntable means in substantially tray-bottom horizontal orientation and accessibly positioned relative to a source of said longitudinally moving tape, comprising a holding bracket with a first section suitably constructed for fastening attachment to a tape-perforating instrument, and a second section adapted to secure said turntable means in the above-indicated tray-bottom horizontal and tape-accessible position when said first section is fastenably attached to said tape-perforating instrument;

(d) tape guideway means comprising a guideway channel adapted to receive longitudinally moving tape and deliver it to the tray of said turntable means from a discharge end situated substantially above the flat bottom of the tray and disposed substantially radially inwardly of its peripheral side wall, said channel being so sized and configured as to permit loosely sliding travel of the tape therethrough, yet sufficiently confining to prevent escape of said tape therefrom during such travel, and support and positioning means for said channel; and (e) auxiliary means adapted to secure the means in the foregoing subparagraphs in mutually cooperative positional, and fixed spatial, relationship;

(f) said means of said foregoing subparagraphs being so sized, configured and function-coordinated when thus secured, and when the first section of the holding bracket of subparagraph (c) is fastenably attached to a tape-perforating instrument, as to guide longitudinally moving tape from the tape-perforating instrument through said guideway means to the tray of said turntable means and discharge it thereonto, in edge-standing orientation, within the confines of, and in a curving path of convergence with, the peripheral side wall of said tray;

(g) whereby force from the moving tape is transmitted tangentially to the peripheral side wall of said tray thereby causing the tray to rotate so long as the tape discharge from said guideway means continues;

(h) and whereby the moving tape, after being deposited on the tray and transmitting said force to the peripheral side wall thereof, rides around with said tray in lower edge contact with its bottom, thereby forming spiralling coils which build inwardly to form a roll;

(i) the tray and guideway means being so positionally oriented, relative to each other, as to permit removal of a roll of tape so formed from the former without positional change of the latter, said holding bracket being of strap metal construction with said first and second sections integral with an interconnecting portion of at least partially horizontal orientation during use, said guideway means being fixedly secured, near its tape receiving end, to the interconnecting portion of the holding bracket, and in parallel adjacency to at least a part thereof, by means of a section of strap metal fastened flush against an undersurface of each.

References Cited

UNITED STATES PATENTS

| | | | |
|---|---|---|---|
| 1,119,489 | 12/1914 | Bingham | 242—55.21 |
| 2,443,248 | 6/1948 | Hurley | 242—55.18 X |
| 2,846,158 | 8/1958 | Hendershot | 242—55 |
| 3,153,517 | 10/1964 | Blank et al. | 242—55.21 |

GEORGE F. MAUTZ, *Primary Examiner.*